Jan. 19, 1965  E. J. AMREIN  3,165,967
PIANO TEACHING DEVICE
Filed April 10, 1962  3 Sheets-Sheet 1
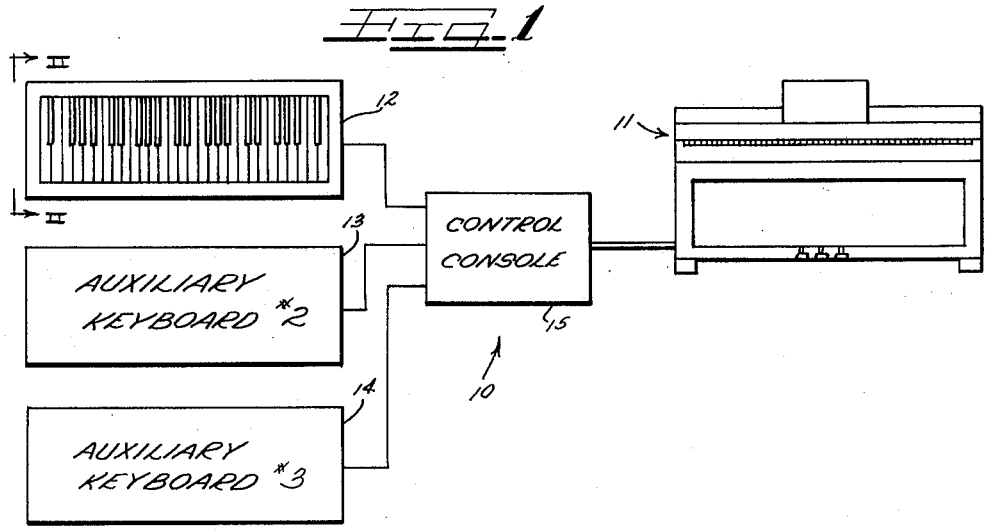
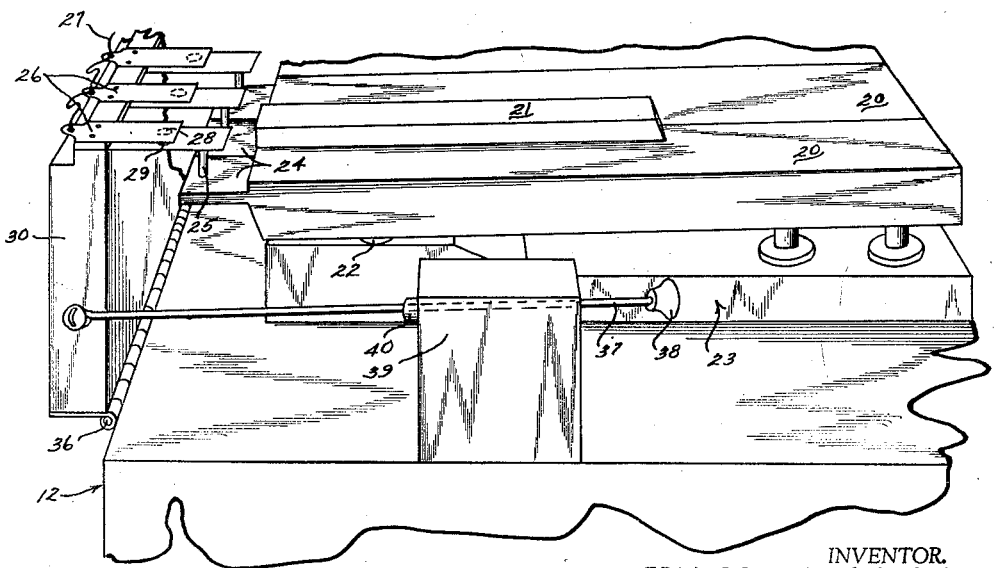
INVENTOR.
EDWARD J. AMREIN
BY
ATTORNEYS Jan. 19, 1965

E. J. AMREIN 3,165,967

PIANO TEACHING DEVICE

Filed April 10, 1962

INVENTOR.
EDWARD J. AMREIN

BY

ATTORNEYS

Jan. 19, 1965  E. J. AMREIN  3,165,967
PIANO TEACHING DEVICE
Filed April 10, 1962  3 Sheets-Sheet 3
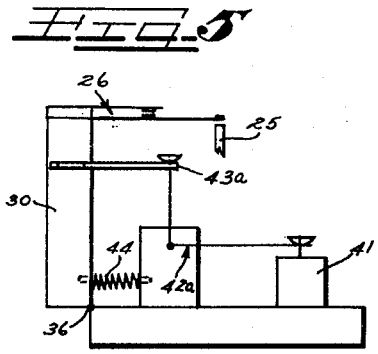
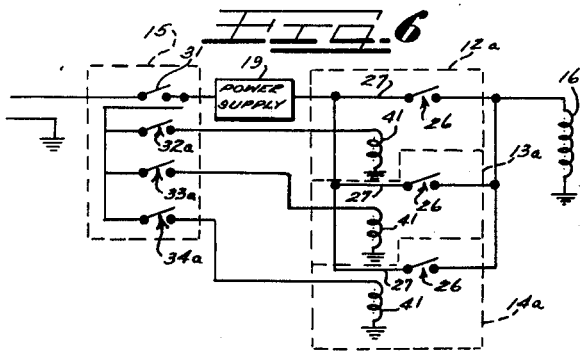
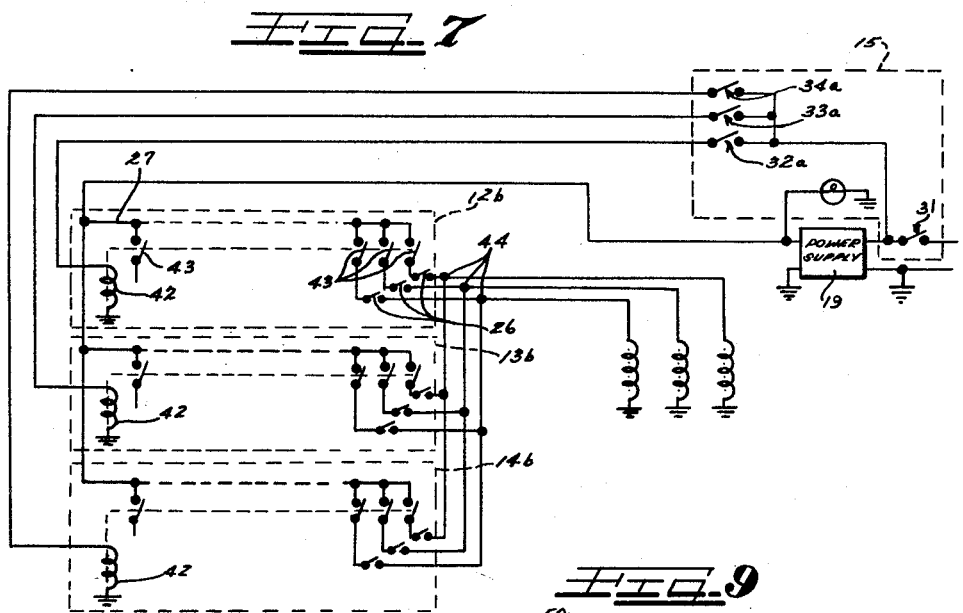
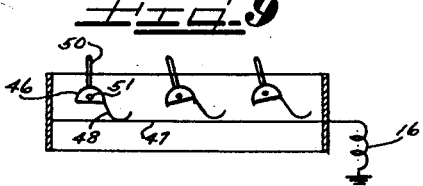
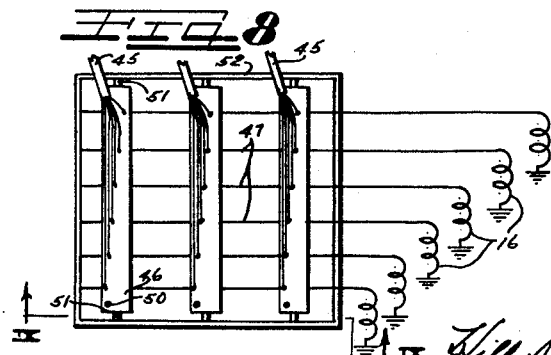
INVENTOR.
EDWARD J. AMREIN
BY
ATTORNEYS

United States Patent Office 3,165,967
Patented Jan. 19, 1965

3,165,967
PIANO TEACHING DEVICE
Edward J. Amrein, South Haven, Mich., assignor, by mesne assignments, to Everett Piano Company, South Haven, Mich., a corporation of Delaware
Filed Apr. 10, 1962, Ser. No. 186,419
4 Claims. (Cl. 84—470)

This invention relates generally to pianos, and more specifically to an improved device or system for use in group piano instruction.

Although the principles of the present invention may be included in various embodiments, a particularly useful application is made in an upright piano, so modified that a number of students may be simultaneously instructed thereon in the use thereof.

An early form of group piano instruction included the provision of a printed life-size keyboard for each student. These printed keyboards were disposed on tables or desks, whereby a considerable number of pupils could simultaneously employ the same at a minimum of cost and with a minimum of bedlam, there being only one actual piano in the room. This system met with some success, but lacked realism for the student, except in the visual sense.

To improve thereon, there was thereafter provided a plurality of independent auxiliary keyboards, each of which included keys that actually went up and down, working against springs or weights, the piano teaching being otherwise similar to that described in the preceding paragraph. This constituted an improvement since both visual and touch senses were satisfactorily realistic. The provision of these added keyboards, which produced no musical sound, were not overly expensive and kept the noise factor to a minimum, but like the preceding system, they lacked musical realism for the student who was using the auxiliary keyboard.

The present invention contemplates the utilization of a single piano, as before, together with an auxiliary keyboard for each student in the classroom. However, whereas in prior systems these components were entirely independent of each other, the present invention electrically connects these various units together to comprise a single device or system, the same being achieved with a minimum of cost, and the noise factor still held to a minimum. However, with this invention, as is brought out below, each auxiliary keyboard can remotely operate the piano, there being structural means provided by which the instructor can selectively operatively couple and uncouple a particular auxiliary keyboard whereby the noise factor is still held to a minimum. To this end, the piano is provided with a solenoid actuator for the keys noramlly used in such instruction, each one of which is under the operative control of the corresponding key in each of the auxiliary keyboards, the number of which that are coupled to the piano itself being selectably variable.

Accordingly, it is an object of the present invention to provide an improved piano teaching device.

Another object of the present invention is to provide a piano teaching device wherein auxiliary keyboards actually effect the production of the notes played by the student.

Yet another object of the present invention is to provide a device of the type described wherein when a first student is remotely playing the piano, it will be impossible for a second student to introduce spurious notes being played.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIGURE 1 is a diagrammatic view of a piano teaching device or system provided in accordance with the principles of the present invention;

FIGURE 2 is an enlarged fragmentary perspective viewed generally from along the line II—II of FIGURE 1;

FIGURE 5 is a diagrammatic view illustrating a modification of a portion of the structure shown in FIGURE 2;

FIGURE 6 is a single-note diagrammatic view illustrating the modifications made to the circuit of FIGURE 4 when the structure of FIGURE 5 is included;

FIGURE 7 is a further circuit diagram, simplified in nature, showing a further modification of the circuit of FIGURE 4;

FIGURE 8 is a still further modification illustrating a further means by which the circuit of FIGURE 7 may be modified; and FIGURE 9 is a cross-sectional schematic view taken generally along line IX—IX of FIGURE 8.

As shown on the drawings:

The principles of this invention are particularly useful when embodied in a piano teaching device or system such as illustrated in FIGURE 1, generally indicated by the numeral 10. The piano teaching device includes a piano 11, a plurality of auxiliary keyboards of which only those indicated at 12–14 are illustrated, and suitable means interconnecting these components which means includes a control console 15. The piano 11 is basically a conventional piano of the 88-note type. Each auxiliary keyboard, such as 12–14, includes a reduced or abbreviated number of keys of standard size, a 49-note keyboard being recommended to cover ordinary teaching requirements. The control console 15 may be physically secured to the piano 11 if desired, and may also be disposed at a remote location therefrom. However, it is recommended that it be disposed remotely from each of the auxiliary keyboards 12–14 so that the students have a minimum of physical and optic access thereto.

Figure 3:
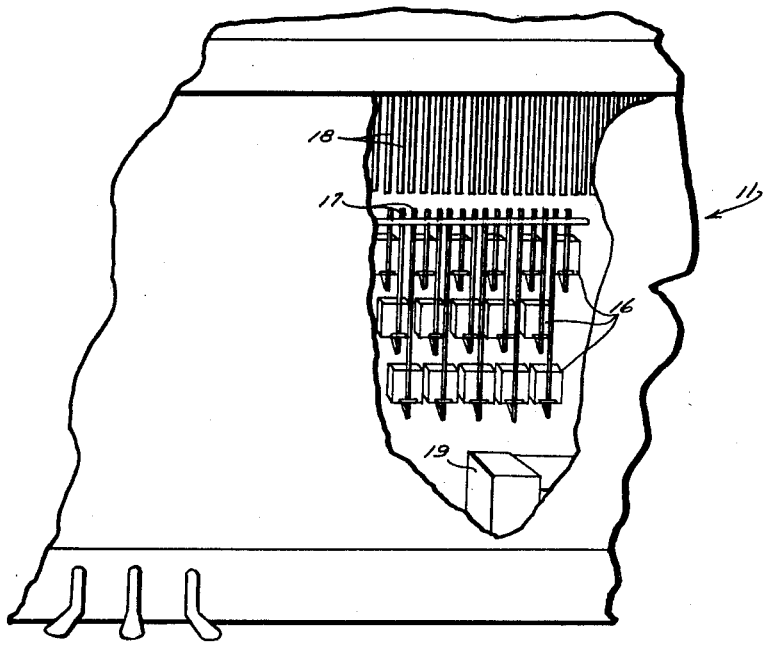
FIGURE 3 is an enlarged fragmentary perspective illustrating a portion of the piano structure of FIGURE 1.

Referring to FIGURE 3, the piano 11 is provided with a number of electric solenoids 16 corresponding in quantity to the number of keys on the auxiliary keyboards. The solenoids 16 are secured rigidly to the piano 11, and each solenoid 16 is provided with an actuator or rod 17 disposed in spaced relation to an action element 18, so that when the solenoid 16 is actuated, the rod 17 is raised to engage the action element 18 to play the corresponding note. The solenoids 16 are powered from a power supply 19 which may be disposed within the piano cabinet. Commercially available components 16–19 may be employed, and in accordance with this invention, the solenoids 16 and actuators 17 are provided for the entire central normally used 49-note portion of the piano 11.

Referring to FIGURE 2, it will be seen that each auxiliary keyboard includes white keys 20, and black keys 21 pivotally mounted as at 22 on a key bed generally indicated at 23. Each key is biased to its normal position by means not shown, which are conventional. Each key 20, 21 has a rearward portion 24 which is provided with an upwardly extending actuator 25. Adjacent thereto, there is provided for each key 20, 21, a single pole single throw blade switch 26 of the stack type which is normally open. A common bus or lead 27 which is energized from the power supply 19 is connected to each of the upper blades of the switches 26. Each upper blade has a contact 28 which is normally in spaced relation to a contact 29 carried on the lower blade of the switch 26, which contacts 28 and 29 are therefore normally open. The lower blade extends beyond the contact 29 to be actuated or moved upwardly by the actuator 25 in response to playing of the corresponding key 20, 21. The several switches 26 are carried on a switch supporting block 30, the lower blades of the switches being insulated from each other and each provided with a separate lead extending to the corresponding solenoid 16.

Figure 4:
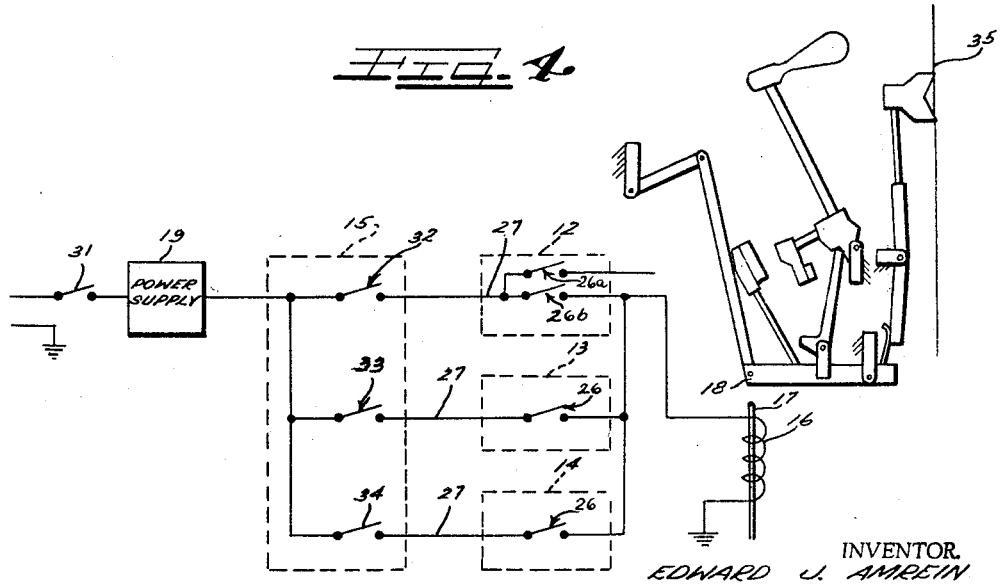
FIGURE 4 is a diagrammatic showing of a simplified single-note system representative of each of the notes in the system.

Referring to FIGURE 4, there is shown a single-note schematic of a simplified nature illustrating the operation of the foregoing. The device or system 10 is energized as a whole by the closing of a switch 31 whereupon the power supply 19 provides a proper potential for the bus 27 of each auxiliary keyboard 12–14. This potential passes by suitable wiring from the power supply 19 to the control console 15 which has a switch 32–34 for each auxiliary keyboard 12–14 respectively. Thus, upon closing of the control console switch 32, the power from the power supply 19 is conducted to the bus 27 leading to the one side of all of the switches 26 of the auxiliary keyboard 12. Upon closing of one of the switches 26, the power is conducted to the coil of the solenoid 16 whereupon the actuator 17 is raised into engagement with the action element 18, here illustrated as being the wippen of a conventional action for a string 35. Holding one of the keys 20, 21 continually in a downward position will hold the corresponding switch 26 continually closed so that the piano action behaves in response thereto the same as if one of the regular keys of the piano 11 were held downwardly. Although the diagram of FIGURE 4 is relatively simplified, it will be understood that there is provided a switch such as 32–34 for each of the auxiliary keyboards, that the number of auxiliary keyboards will be at least two and usually considerably greater, and that the number of keys 20, 21 and switches 26 in each auxiliary keyboard will typically be somewhat greater such as 49 in number, and that the number of solenoids 16 will also correspond thereto.

When a complete system is provided and wired in accordance with the principles illustrated of FIGURE 4, the instructor will close one of the switches 32–34 on the control console 15, thereby electrically coupling it to the piano 11. If, for example, there are thirty students each simultaneously practicing on an auxiliary keyboard, the students will not be aware of which auxiliary keyboard or student is thus coupled to the piano 11. Moreover, the instructor can selectively listen to the actual performance of any one of the pupils selected by suitable switching at the control console. It is also evident that by closing two of the control console switches, such as 32–34, the system will provide a means for the playing of a duet on a single piano wherein each player has available to him the entire keyboard range that is equipped with this invention.

The simplified system of FIGURE 4 has one disadvantage which can best be explained by a hypothetical example. Assuming that switch 33 is closed and that the student on the auxiliary keyboard 13 properly closes the switch 26 which is illustrated, it is evident that the illustrated solenoid 16 will operate the action properly. Assuming further that all other switches such as 32 and 34 are open, and that the student who is using the auxiliary keyboard 12 is simultaneously closing both switches 26a and 26b which are illustrated, the upper one being connected to a different solenoid 16 which is not illustrated, it is evident that the power directed to the illustrated solenoid 16 will flow into the auxiliary keyboard 12, through the closed lower switch 26b to the bus 27 and thence to the upper closed switch 26a to its corresponding solenoid. In this example, it is assumed that the solenoid associated with the upper switch 26a of the auxiliary keyboard 12 should not then be energized, and therefore the student at the auxiliary keyboard 12 was able to effect the playing of a spurious note, even though the corresponding control switch 32 was then open.

Accordingly, it is desirable that any embodiment of this invention include structure rendering it impossible for such spurious note production to occur. I have illustrated several means, both structures and circuits, which achieve this result.

Referring first to FIGURE 2, the switch supporting block 30 is supported by a hinge 36 which enables the pivoting of all of the switches 26 as a group away from the respective actuators 25. A control rod 37 having a knob 38 under the control of the student is slidably and frictionally supported and retained by a friction support block 39, there being a stop 40 provided on the rod 37 which defines or locates the switch support block in the proper or illustrated position for use. When the knob 38 is pushed inwardly, all the switches, all of which are normally open, are moved out of possible engagement with the actuators 25 so that nothing that the pupil using the auxiliary keyboard 12 can do, can possibly be electrically sensed or responded to. It is evident that when this structure is employed, the switches 32–34 could be omitted, but doing so has the disadvantage of placing the student entirely on his honor. Each auxiliary keyboard would be provided with such a switch-tilting means. This structure has the disadvantage that the pupil is thus mindful that he is or is not coupled to the piano 11, and operation of the knob 38 also distracts from the music lesson.

Referring to FIGURES 5 and 6, there is provided a remote actuator for tilting the switch block 30. In this modification, there is provided a solenoid 41 in each auxiliary keyboard which solenoid, when operated, pivots a bell crank 42a to its clockwise extreme as illustrated, thereby acting on a pivoting lever 43a secured to the switch support block 30. Upon deenergization of the solenoid 41, a spring 44 pivots the switch support block 30 in a counterclockwise direction about the hinge 36, thereby spacing the lower blade of the various switches 26 from their corresponding actuators 25. As best seen in FIGURE 6, the control console 15 is provided with the switch 31 and with a switch 32a–34a for each of the auxiliary keyboards, the switches 32a–34a being connected to operate the corresponding control solenoid 41 on the various auxiliary keyboards 12a–14a. When this structure is utilized, the various buses 27 may be left continually energized or connected to the power supply 19 as suggested previously, since closing of a spurious key on a non-selected auxiliary keyboard does not then effect closing of its corresponding key switch 26. With the circuit of FIGURE 6, the student is ordinarily entirely unaware of which of the selector switches 32a–34a is closed, and moreover, his services are not ever employed in the selection or coupling of his auxiliary keyboard. Yet there is a possibility that there will be a minute change in touch or that the operation of the solenoid 41 will be physically sensed by the pupil.

Accordingly, there is shown in FIGURE 7 a further modification where even these disadvantages are entirely avoided. In this embodiment, the control console 15 includes the selector switches 32a–34a as in FIGURE 6, but each of them is connected to a coil 42 of a 49-pole single throw relay switch. The various poles or switches thereof are indicated at 43 and are illustrated as severally acting between the bus 27 and the key switches 26. It is to be understood that the relay switch elements 43 could be located on either side of the switches 26, but prior to their connections 44 with other auxiliary keyboards. Thus the relays 42 may be disposed either within or remotely from the respective auxiliary keyboards 12b–14b.

Referring now to FIGURES 8 and 9, there is shown an alternative switch structure for the control console which may be used in place of the relay system of FIGURE 7. For reasons of simplicity of illustration, the structure in FIGURE 8 has been illustrated as being associated with three auxiliary keyboards having six notes each, it being understood that 49 notes would be a typical quantity, and that a considerably larger number of auxiliary keyboards may be employed. To employ the console switch structure of FIGURES 8 and 9, power is brought as before through a master switch 31 to the power supply 19, and thence through buses 27 to each of the key switches 26 of each of the auxiliary keyboards. The non-common sides of the various switches 26 are each provided with a lead, such leads being brought together as a cable 45, the other end of each of the leads terminating on a pivotal switch bar 46 where each is insulated from the other. The switch bar 46 extends transversely to a number of bus bars 47, each of which is connected to one of the solenoids 16. To the end of each lead wire from each switch 26 there is attached a contact finger 48 shown in FIGURE 9, which is engageable with the bus bar 47. Thus, a typical member 46 would include 49 of the contacts 48, each engageable with a different one of the bus bars 47. Each of the members 46 is provided with a manually operable lever 50 which the instructor may rock and thereby pivot the corresponding member 46, the member 46 having pivotal bearings 51 or journals supported by a frame 52 which could be a part of the case of the control console 15. It is evident that rocking of one of the contact supporting members 46 by movement of the lever 50 will raise all the contact fingers 48 from the buses 47 substantially simultaneously or will lower the same. Thus, any selected number of auxiliary keyboards or combinations thereof may be simultaneously placed in coupled or uncoupled condition. Since the tilting of the contact support member 46 breaks all connection between any one auxiliray keyboard and the solenoids 16, such uncoupled auxiliary keyboard cannot possibly be played in a manner to introduce spurious signals.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A piano teaching device comprising, in combination, a piano having strings and hammers for striking said strings, a plurality of auxiliary dummy piano-type keyboards remote from said piano each having a plurality of keys, a first set of electrical switches for each of said keyboards, said set having a switch associated with each key, said switches being adapted to be closed in response to the playing of the associated keys, a series of electrical solenoids adapted to operate said hammers individually, each solenoid being electrically connected to all the corresponding ones of said switches of said plurality of keyboards in parallel, and a second set of clustered electrical switches remote from said keyboards, one for each of said first sets of switches connected in series with the first sets associated therewith and in parallel with each other for operatively disconnecting each keyboard from said solenoids.

2. The combination as set forth in claim 1 including additionally means for each of said keyboards operative to preclude possible solenoid operation by feedback through a disconnected keyboard as a result of playing, simultaneously with a certain key on a connected keyboard, the corresponding key and a non-corresponding key on said disconnected keyboard.

3. The combination as set forth in claim 2 wherein said means includes mechanism for moving said first set of switches out of operative relation with the keys of the associated keyboard upon disconnection thereof.

4. A piano teaching device comprising, in combination, a piano having strings and hammers for striking said strings, a plurality of auxiliary dummy piano-type keyboards remote from said piano each having a plurality of keys, a first set of electrical switches for each of said keyboards, said set having a switch associated with each key, said switches being adapted to be closed in response to the playing of the associated keys, a series of electrical solenoids adapted to operate said hammers individually, each solenoid being electrically connected to all the corresponding ones of said switches of said plurality of keyboards in parallel, a second set of electric switches for each of said keyboards, each switch of which is individually connected in series with one of said key-responsive switches and remote, clustered, manually operative means for each of said second sets of switches, said means effecting opening and closing of all the switches in the said second corresponding set of switches simultaneously.

References Cited in the file of this patent
UNITED STATES PATENTS

| | | |
|---|---|---|
| 1,924,713 | Eremeeff | Aug. 29, 1933 |
| 2,477,741 | Haberman | Aug. 2, 1949 |
| 2,927,494 | Johnson | Mar. 8, 1960 |
| 3,001,431 | Andersen | Sept. 26, 1961 |